United States Patent Office 3,405,076
Patented Oct. 8, 1968

3,405,076
BORON-CONTAINING POLYMERS AND PROCESS FOR MAKING THE SAME
Joseph Green, Dover, and Nathan Mayes, Ironia, N.J., assignors to Thiokol Chemical Corporation, Bristol, Pa., a corporation of Delaware
No Drawing. Filed Nov. 27, 1964, Ser. No. 414,431
11 Claims. (Cl. 260—2)

ABSTRACT OF THE DISCLOSURE

Curable hydroxy-terminated copolymers having the repeating unit

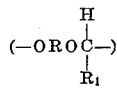

wherein $R_1$ is an aliphatic group and R is a divalent linear group including a carboranyl group therein, e.g. a divalent linear carboranyl ether group, formed by reacting an aldehyde $R_1CHO$ with a carboranyl diol HOROH.

---

The present invention relates to novel polymers containing boron and to methods for making the same.

In recent years there has been considerable interest in boron-containing compounds. The high-heat-resistance of boron-containing polymers makes them especially attractive for incorporation into coating compositions and use in potting compounds and laminating resins.

The novel boron-containing polymers of the invention are made from monomers that may all be considered derivatives of carboranes, i.e. compounds of carbon, hydrogen and boron having the empirical formula $C_2H_{12}B_{10}$. Such carboranes include both isomeric forms of carborane, i.e. the term "carboranes" as used throughout this disclosure is intended to cover the carborane radical (⊖) i.e.

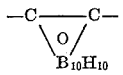

neocarborane ⊕ of the formula —C—$B_{10}H_{10}$—C—, and formulas,

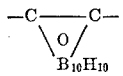

and —C—$B_{10}H_{10}$—C— respectively.

It is an object of this invention to provide boron-containing copolymers useful as coatings, potting resins and laminating resins. It is another object to provide hydroxy-terminated boron-containing copolymers that are curable to form heat-resistant materials. It is still a further object of the invention to provide valuable elastomeric copolymers of formaldehyde and a boron-containing compound. It is also an object of this invention to provide processes for making the aforesaid copolymers and for curing them.

The copolymers of the present invention comprise reaction products of aldehydes with boron-containing diols. The general reaction by which copolymers of the instant invention are formed may be represented by the following reaction:

wherein R stands for a divalent linear group containing a carboranyl radical, $R_1CHO$ represents an aldehyde, and $n$ represents the total number of repeating polymeric units.

The molecular weight of polymers so formed is determined by the ratio of the diol and aldehyde reactants. The closer the ratio of reactants approaches a 1:1 molar ratio, the higher the molecular weight that may be obtained. Molecular weights of these copolymers may range from about 600 to 100,000.

Polymers of the present invention may be effectively crosslinked by use of tri-isocyanates and, at temperatures of about 125° C. and above, di-isocyanates. Other crosslinking agents known to the art can also be conveniently used.

Plasticizers useful for compounding with the polymers of the present invention include those known to the art, for example dioctyl phthalate, dioctyl sebacate, and the like. An especially advantageous plasticizer because of its high-energy release on decomposition is isopropenylcarborane which can be prepared by the reaction of isopropenylacetylene and bis(acetonitrilo)decaborane as disclosed in the commonly-owned and copending application Ser. No. 59,457 filed Sept. 29, 1960, now U.S. Patent 3,169,148 granted February 9, 1965.

Boron-containing compounds useful in the process of the present invention include compounds of the general formula HO—R—OH wherein R represents a radical having a carboranyl group which can comprise an ether linkage as exemplified by such compounds as bis(2-hydroxyethyl-1-carboranylmethyl)ether and bis(hydroxyethyl) carborane of the respective formulas

and

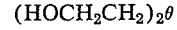

Other useful diol compounds are disclosed in, for example, the commonly-owned and copending applications Serial No. 269,838 of Daniel Grafstein et al. filed March 28, 1963, now U.S. Patent 3,306,933 granted February 28, 1967, and Serial No. 324,168 filed by Green et al. on November 13, 1964, now U.S. Patent No. 3,351,616.

Aldehydes useful as comonomers in the process of the present invention include formaldehyde, acetaldehyde, propionaldehyde, crotonaldehyde, and the like. When formaldehyde is used, it is to be understood that it may also be obtained from its paraformaldehyde and trioxane forms. Indeed, these forms are usually more convenient for use in the process of the present invention than formaldehyde itself.

The groups —R— containing a carboranyl radical should be chosen so that at least two adjacent carboranyl groups of every three successive carboranyl groups are separated by six atoms or more. This requirement has been found to allow sufficient distance between carboranyl groups to avoid excessive steric hindrance of the polymerization reaction and also to avoid excessive formation of non-polymeric materials. This spacing can be obtained by proper selection of monomers. For example, the polymeric product of bis(hydroxyethyl)carborane and formaldehyde comprises copolymeric units of the formula

wherein it is seen that carboranyl groups spaced along a linear chain are separated by seven atoms. Linear polymers of excellent thermoplastic properties may be obtained when bis(2-hydroxyethyl-1-carboranylmethyl)ether is reacted with formaldehyde resulting in copolymers with the carboranyl groups separated from adjacent carboranyl groups along a linear chain by three and seven atoms.

Where the number of atoms separating successive carboranyl groups as described above is five or less, non-polymeric materials are likely to form in large quantities with little or no polymer formation.

In order to point out more fully the nature of the present invention, the following specific example is given as an illustrative embodiment of the present process and products produced thereby.

Example

Bis(2-hydroxyethyl-1-carboranylmethyl)ether of the formula (HOCH$_2$CH$_2\theta$CH$_2$)$_2$O was prepared by reacting bis-(2-carboranylmethyl)ether with ethylene oxide as disclosed in the aforementioned U.S. Patent 3,306,933. To 8.37 grams (0.02 mole) of this material, placed in a 50 ml. reaction flask equipped with a nitrogen ebullator, a stirrer, and a Dean-Stark receiver, were added 1.0 gram (0.033 mole) of paraformaldehyde, 20 ml. of xylene, and 0.07 gram of para-toluene sulfonic acid catalyst. These compounds formed a solution which was heated under reflux for eight hours. A total of 0.3 ml. of water was collected in the receiver during the eight-hour period.

The solvent was then evaporated from the reaction mixture to leave a solid, dark-colored material. Catalyst was removed from the dark material by dissolving it in ether and washing it with aqueous sodium hydroxide. In this manner a colorless material was produced. This material, a copolymer of formaldehyde and bis(2-hydroxyethyl-1-carboranylmethyl)ether, melted at about 63° C. The molecular weight of the material was determined cryoscopically in benzene and found to be 2200.

A portion of the copolymer was removed and tested for solubility in various organic solvents. It was found to be soluble in benzene, xylene, phenol and other aromatics.

Another portion of the copolymer was plasticized with an equal weight of isopropenyl carborane and then reacted in the presence of 5% of a mixture of tri- and di-isocyanates sold under the trade name Hylene DP by E. I. du Pont de Nemours & Co. This reaction was carried out at 100° C. over a 24-hour period. The resulting product was a cured elastomeric solid which had been crosslinked by reaction between terminal hydroxyl groups on the copolymer macromolecules and the polyisocyanate.

Polymers of the following monomers may be prepared according to the above procedure.

| Monomer A | Monomer B |
|---|---|
| Bis(2-hydroxyethyl-1-methylcarboranyl)ether. | Formaldehyde. |
| 1-hydroxyethyl-2-hydroxypropylcarborane. | Acetaldehyde. |
| Bis(hydroxyethyl)carborane. | Crotonaldehyde. |

It is of course to be understood that the foregoing examples are intended to be illustrative and that numerous changes can be made in the reactants, proportions, and conditions set forth therein without departing from the spirit of the invention as defined in the appended claims.

We claim:

1. An hydroxy-terminated copolymer consisting essentially of the repeating unit

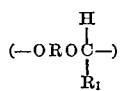

wherein R is a divalent linear group including a carboranyl group therein and R$_1$ is an aliphatic hydrocarbon radical, said copolymer having at least six atoms selected from the group consisting of carbon atoms and oxygen atoms in the chain thereof between two adjacent carboranyl groups of each three successive carboranyl groups.

2. A copolymer as in claim 1 having a molecular weight of from about 600 to 100,000.

3. A copolymer as in claim 2 in cured form.

4. A copolymer as in claim 1 wherein said aldehyde is formaldehyde.

5. A copolymer as in claim 1 wherein said first monomer is bis(2-hydroxyethyl-1-carboranylmethyl)ether.

6. A copolymer as in claim 1 wherein said first monomer is bis(hydroxyethyl)carborane.

7. A copolymer as in claim 1 wherein said divalent linear group including a carboranyl group therein is a divalent carboranyl ether group.

8. A process for the preparation of an hydroxy-terminated copolymer consisting essentially of the repeating unit

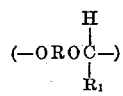

wherein R is a divalent linear group including a carboranyl group therein and R$_1$ is an aliphatic hydrocarbon radical, which process comprises reacting an aliphatic aldehyde of the formula R$_1$CHO with a diol of the formula HOROH, wherein R and R$_1$ have their earlier meanings, said copolymer having at least six atoms selected from the group consisting of carbon atoms and oxygen atoms in the chain thereof between two adjacent carboranyl groups of each three successive carboranyl groups.

9. A process as in claim 8 wherein said divalent linear group including a carboranyl group therein is a divalent carboranyl ether group.

10. A process as in claim 8 wherein said hydroxy-terminated copolymer is subsequently cured with a curing agent reactive with the terminal hydroxy groups thereof.

11. A process as in claim 10 wherein said curing agent is a polyisocyanate.

References Cited

UNITED STATES PATENTS

| | | | |
|---|---|---|---|
| 3,256,246 | 6/1966 | Gutweiler et al. | 260—67 |
| 3,306,933 | 2/1967 | Grafstein et al. | 260—535 |

OTHER REFERENCES

English translation of Kern et al., Angewandte Chemie, vol. 73, No. 6, March 21, 1961, pp. 177–186 (Topic E relied upon, pp. 183–185 or 15–19 of the translation).

Sittig, Hydrocarbon Processing & Petroleum Refiner, vol. 41, No. 11, November 1962, pp. 131–170 (p. 151 relied upon).

WILLIAM H. SHORT, *Primary Examiner.*

L. M. PHYNES, *Assistant Examiner.*